(12) United States Patent
Park et al.

(10) Patent No.: US 11,610,339 B2
(45) Date of Patent: Mar. 21, 2023

(54) IMAGING PROCESSING APPARATUS AND METHOD EXTRACTING A SECOND RGB TOF FEATURE POINTS HAVING A CORRELATION BETWEEN THE FIRST RGB AND TOF FEATURE POINTS

(71) Applicant: LG INNOTEK CO., LTD., Seoul (KR)

(72) Inventors: Jung Ah Park, Seoul (KR); Seung Won Lee, Seoul (KR); Dong Gyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/268,898

(22) PCT Filed: Aug. 26, 2019

(86) PCT No.: PCT/KR2019/010865
§ 371 (c)(1),
(2) Date: Feb. 16, 2021

(87) PCT Pub. No.: WO2020/045932
PCT Pub. Date: Mar. 5, 2020

(65) Prior Publication Data
US 2021/0327091 A1 Oct. 21, 2021

(30) Foreign Application Priority Data
Aug. 27, 2018 (KR) .................. 10-2018-0100443

(51) Int. Cl.
*G06T 7/80* (2017.01)
*G06T 7/33* (2017.01)
(Continued)

(52) U.S. Cl.
CPC .................. *G06T 7/85* (2017.01); *G06T 7/33* (2017.01); *G06T 7/593* (2017.01); *G06V 10/56* (2022.01);
(Continued)

(58) Field of Classification Search
None
See application file for complete search history.

(56) References Cited

U.S. PATENT DOCUMENTS 9,838,677 B1 12/2017 Ramaswamy
9,866,820 B1* 1/2018 Agrawal ............. H04N 13/239
(Continued)

FOREIGN PATENT DOCUMENTS

JP 2017-142829 A 8/2017

OTHER PUBLICATIONS

Li et al., "Generating Colored Point Cloud under the Calibration between TOF and RGB Cameras", Proceeding of the IEEE International Conference on Information and Automation, Yinchuan, China, Aug. 2013, pp. 483-488.

*Primary Examiner* — Stefan Gadomski
(74) *Attorney, Agent, or Firm* — Birch, Stewart, Kolasch & Birch, LLP

(57) ABSTRACT

An image processing apparatus and method of extracting a second RGB feature point and a second ToF feature point such that a correlation between the first RGB feature point and the first ToF feature point is equal to or greater than a predetermined value; calculating an error value between the second RGB feature point and the second ToF feature point; updating pre-stored calibration data when the error value is greater than a threshold value, and calibrating the RGB image and the ToF image by using the updated calibration data; and synthesizing the calibrated RGB and ToF images.

19 Claims, 13 Drawing Sheets

(51) Int. Cl.
  *G06T 7/593* (2017.01)
  *H04N 13/239* (2018.01)
  *H04N 9/09* (2006.01)
  *H04N 17/00* (2006.01)
  *G06V 10/56* (2022.01)
  *H04N 13/271* (2018.01)

(52) U.S. Cl.
  CPC ............. *H04N 9/09* (2013.01); *H04N 13/239* (2018.05); *H04N 13/271* (2018.05); *H04N 17/002* (2013.01); *G06T 2207/10024* (2013.01); *G06T 2207/10048* (2013.01); *G06T 2207/20092* (2013.01); *G06T 2207/20221* (2013.01)

(56) References Cited

U.S. PATENT DOCUMENTS

| | | | | |
|---|---|---|---|---|
| 10,325,402 | B1* | 6/2019 | Wang | G06T 15/503 |
| 10,818,025 | B2* | 10/2020 | Park | G06T 7/593 |
| 2011/0141306 | A1* | 6/2011 | Nakano | G06V 10/255 |
| | | | | 348/222.1 |
| 2014/0198185 | A1* | 7/2014 | Haugen | G01B 11/2513 |
| | | | | 348/47 |
| 2015/0319347 | A1* | 11/2015 | Cottrell | H04N 5/2256 |
| | | | | 348/81 |
| 2015/0381968 | A1* | 12/2015 | Arora | G06T 7/55 |
| | | | | 348/47 |
| 2016/0150211 | A1* | 5/2016 | Hwang | H04N 13/128 |
| | | | | 348/43 |
| 2017/0034502 | A1* | 2/2017 | Aurongzeb | G06T 7/80 |
| 2017/0070731 | A1* | 3/2017 | Darling | G06T 7/85 |
| 2017/0104979 | A1 | 4/2017 | Shaw et al. | |
| 2017/0206660 | A1* | 7/2017 | Trail | G06T 19/006 |
| 2017/0243369 | A1* | 8/2017 | Iida | G06V 10/44 |
| 2017/0243372 | A1* | 8/2017 | Iida | G06T 7/75 |
| 2018/0082441 | A1* | 3/2018 | Kim | G06T 7/85 |
| 2018/0108150 | A1* | 4/2018 | Curtis | H04N 13/246 |
| 2018/0120437 | A1* | 5/2018 | Webster | G01B 11/002 |
| 2018/0137346 | A1* | 5/2018 | Mori | G06T 7/70 |
| 2018/0150723 | A1* | 5/2018 | Kim | G06V 10/752 |
| 2018/0300898 | A1* | 10/2018 | Eshima | G01C 21/005 |
| 2018/0315205 | A1* | 11/2018 | Moribe | G06T 5/50 |
| 2018/0350107 | A1* | 12/2018 | Myokan | G06T 7/74 |
| 2019/0033448 | A1* | 1/2019 | Molnar | H04N 13/254 |
| 2019/0139296 | A1* | 5/2019 | Lakshman | H04N 19/597 |
| 2020/0103509 | A1* | 4/2020 | MacMillan | G01S 17/58 |
| 2021/0110574 | A1* | 4/2021 | Kaino | G06T 7/73 |
| 2021/0209799 | A1* | 7/2021 | Sugawara | G01B 11/002 |

* cited by examiner (a)   (b)

(a)　　　　　　　(b)　　　　　　　　(c)

OBJECT
50 cm ~ 52 cm AWAY

OBJECT
51.5 cm AWAY (a)　　　　　　　　　　　(b)

IMAGING PROCESSING APPARATUS AND METHOD EXTRACTING A SECOND RGB TOF FEATURE POINTS HAVING A CORRELATION BETWEEN THE FIRST RGB AND TOF FEATURE POINTS

CROSS REFERENCE TO RELATED APPLICATIONS

This application is the National Phase of PCT International Application No. PCT/KR2019/010865, filed on Aug. 26, 2019, which claims priority under 35 U.S.C. 119(a) to Patent Application No. 10-2018-0100443, filed in the Republic of Korea on Aug. 27, 2018, all of which are hereby expressly incorporated by reference into the present application.

TECHNICAL FIELD

The present invention relates to an image processing apparatus and an image processing method using an RGB camera and a ToF camera.

BACKGROUND ART

The 3D contents are applied in many fields such as education, manufacturing, and autonomous driving as well as games and culture, and a depth map is required to obtain the 3D content. The depth information is information representing a distance in space, and represents perspective information of one point to the other points in a 2D image.

One of the methods of obtaining the depth information is a method of projecting IR (infrared) structured light onto an object and analyzing the reflected light from the object to extract the depth information. According to the IR structured light method, there is a problem that it is difficult to obtain a desired level of depth resolution for a moving object.

Meanwhile, the Time of Flight (TOF) method is drawing attention as a technology to replace the IR structured light method.

According to the TOF method, the distance to an object is calculated by measuring the flight time, that is, the time that light is emitted and reflected. The greatest advantage of the ToF method is that it provides distance information for 3D space in real time quickly. In addition, the user may obtain accurate distance information without applying separate algorithms or hardware correction. In addition, accurate depth information may be obtained by measuring a very close subject or a moving subject.

Accordingly, a technology for generating a three-dimensional color image is attempted by mounting an RGB camera and a ToF camera together in one device, for example, a mobile device, and fusing a RGB image obtained from the RGB camera and a depth image obtained from the ToF camera.

However, in order to fuse the RGB image and the depth image, the positional relationship between the RGB camera and the ToF camera needs to be precisely mapped. When a distortion occurs between the RGB camera and the ToF camera due to an impact or the like during the user's use, an image with severe distortion may be obtained even with an error of several pixels. Accordingly, there is a need for an efficient calibration method.

SUMMARY

A technical problem to be achieved by the present invention is to provide an image processing method and an image processing apparatus capable of calibrating an RGB camera and a ToF camera.

An image processing method of an image processing apparatus according to an embodiment of the present invention may include obtaining an RGB image from an RGB camera, obtaining a ToF image from a ToF camera, extracting a first RGB feature point from the RGB image, extracting a first ToF feature point from the ToF image, matching the first RGB feature point and the first ToF feature point and extracting a second RGB feature point and a second ToF feature point having a correlation between the first RGB feature point and the first ToF feature point greater than or equal to a predetermined value, calculating an error value between the second RGB feature point and the second ToF feature point, updating pre-stored calibration data when the error value is greater than a threshold value, and calibrating the RGB image and the ToF image by using the updated calibration data, and fusing the calibrated RGB and ToF images.

The ToF image may include at least one of an IR image and a depth image.

At least one of the IR image and the depth image may be generated from IR images for four phases.

The first RGB feature point may be extracted by using at least one of edge information, shape information, size information, and center point information of an object in the RGB image, and the first ToF feature point may be extracted by using at least one of edge information, shape information, size information, and center point information of an object in the ToF image.

The calibration data may include an X value, a Y value, a Z value, a Pitch value, a Roll value and a Yaw value.

The image processing method may further include receiving a drop impact sensing signal from a sensor, wherein the step of calculating the error value may be performed when the falling impact detection signal is received.

The image processing method may further include receiving a drop impact sensing signal from a sensor, wherein the step of extracting the first RGB feature point from the RGB image and the step of extracting the first ToF feature point from the ToF image may be performed when the drop impact sensing signal is received.

The image processing method may further include receiving a calibration request signal from a user interface, wherein the step of extracting the first RGB feature point from the RGB image and the step of extracting the first ToF feature point from the ToF image may be performed, when the calibration request signal is received.

The image processing method may further include obtaining auto-focusing information of the RGB camera from the RGB camera, wherein the second RGB feature point and the second ToF feature point may be extracted by further using the auto-focusing information.

An image processing apparatus according to an embodiment of the present invention may include an image obtaining unit configured to obtain an RGB image from an RGB camera and a ToF image from a ToF camera, a first feature point extraction unit configured to extract a first RGB feature point from the RGB image and a first ToF feature point from the ToF image, a second feature point extraction unit configured to match the first RGB feature point and the first ToF feature point and extract a second RGB feature point and a second ToF feature point having a correlation between the first RGB feature point and the first ToF feature point equal to or greater than a predetermined value, a calibration unit configured to calculate an error value between the second RGB feature point and the second ToF feature point, update pre-stored calibration data when the error value is greater than a threshold value, and calibrate the RGB image and the ToF image by using the updated calibration data, and an image fusing unit configured to fuse the calibrated RGB and ToF images.

The ToF image may include at least one of an IR image and a depth image.

At least one of the IR image and the depth image may be generated from IR images for four phases.

The first RGB feature point may be extracted by using at least one of edge information, shape information, size information, and center point information of an object in the RGB image, and the first ToF feature point may be extracted by using at least one of edge information, shape information, size information, and center point information of an object in the ToF image.

The calibration data may include an X value, a Y value, a Z value, a Pitch value, a Roll value and a Yaw value.

The image processing apparatus may further include a signal receiving unit for receiving a drop impact sensing signal from a sensor, wherein the calibration unit may calculate the error value may be performed when the drop impact sensing signal is received.

The image processing apparatus may further include a signal receiving unit for receiving a drop impact sensing signal from a sensor, wherein the first feature point extraction unit may extract the first RGB feature point from the RGB image and extract the first ToF feature point from the ToF image when the drop impact sensing signal is received.

The image processing apparatus may further include a signal receiving unit for receiving a calibration request signal from a user interface, wherein the first feature point extraction unit may extract the first RGB feature point from the RGB image and extract the first ToF feature point from the ToF image, when the calibration request signal is received.

The image processing apparatus may further include an auto-focusing information obtaining unit for obtaining auto-focusing information of the RGB camera from the RGB camera, wherein second feature point extraction unit may extract the second RGB feature point and the second ToF feature point by further using the auto-focusing information.

Advantageous Effects

Using the image processing apparatus and method according to an embodiment of the present invention, calibration between an RGB camera and a ToF camera may be performed in real time without the need for a user to directly visit a service center. In particular, when the image processing apparatus and method according to an embodiment of the present invention are used, efficient calibration may be performed with a simple operation.

DETAILED DESCRIPTION

Figure 1:
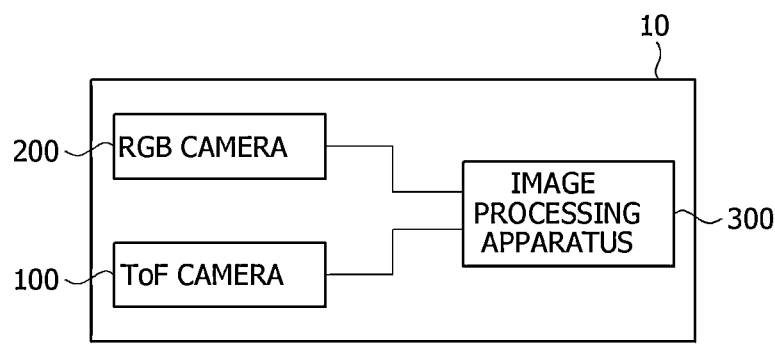
FIG. 1 is a block diagram of an image processing system according to an embodiment of the present invention.

While the present invention may have various modifications added and a number of embodiments, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that, although the terms "first", "second", etc. may be used herein to describe various components, these components should not be limited by these terms. These terms are only used to distinguish one component from another component. For example, a first component discussed below could be termed a second component, and, likewise, the second component discussed below could be termed the first component without departing from the teachings of the present inventive concept. The term "and/or" includes combinations of listed items or one of the listed items.

It should be understood that when an element is referred to as being "connected" or "coupled" to another element, it may be directly connected to the another element or may be coupled to the other element but intervening elements may also be present. In contrast, when an element is referred to as being "directly connected" or "directly coupled" to another element, it should be understood as there being no intervening elements.

The terminology used herein to describe embodiments of the inventive concept is not intended to limit the scope of the inventive concept. Elements of the inventive concept referred to in the singular may number one or more, unless the context clearly indicates otherwise. It will be further understood that the terms "comprise", "have", etc. when used herein, specify the presence of stated features, numbers, steps, operations, elements, components, and/or groups thereof and do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments are described with reference to the attached drawings, the same or corresponding elements will be given the same reference numbers regardless of drawing symbols, and repeated descriptions will be omitted.

Figure 2:
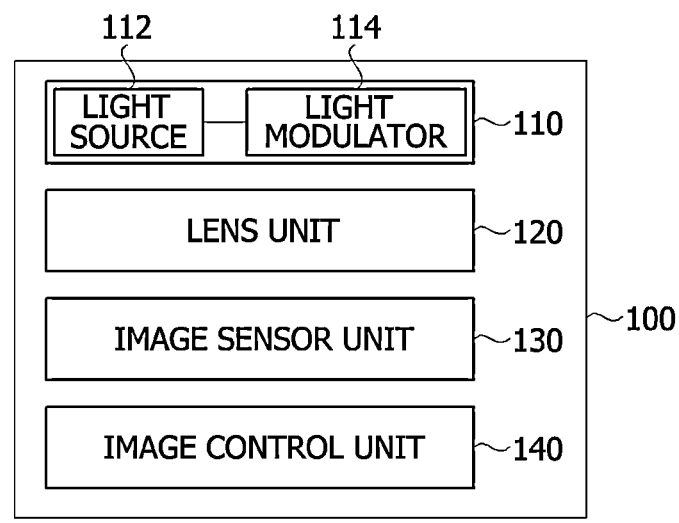
FIG. 2 is a block diagram of a ToF camera module according to an embodiment of the present invention.
Figure 3:
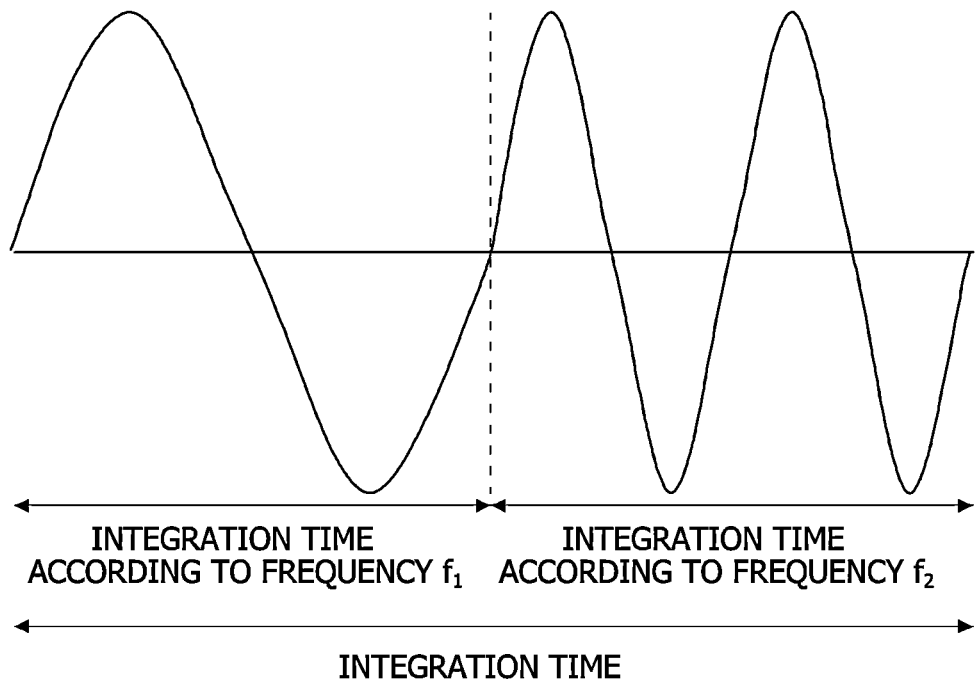
FIG. 3 is a view for explaining frequencies of an output light signal of the ToF camera module according to an embodiment of the present invention.
Figure 4:
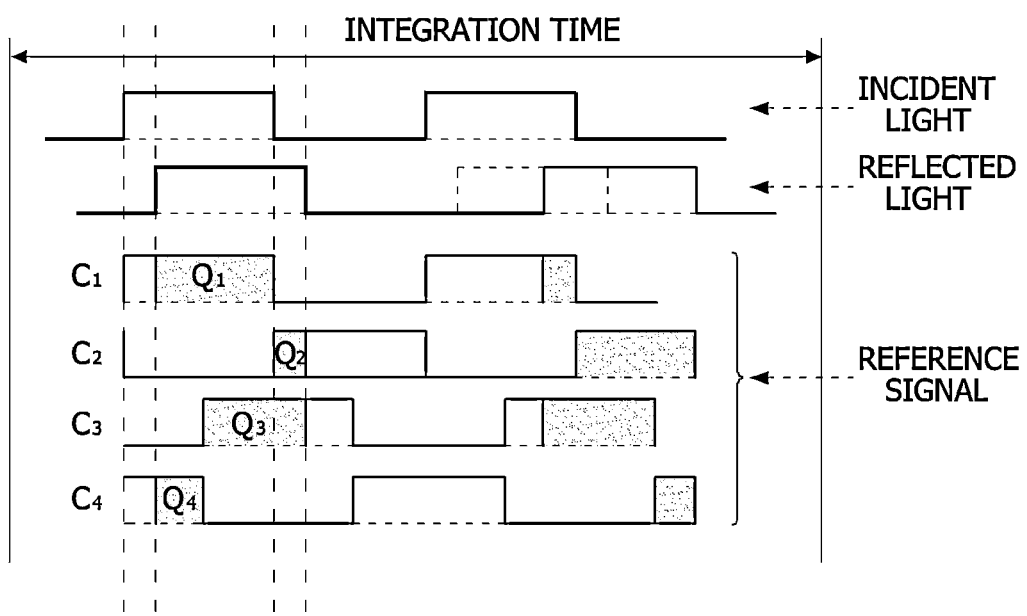
FIG. 4 is a diagram illustrating a process of generating an electric signal according to an embodiment of the present invention.
Figure 5:
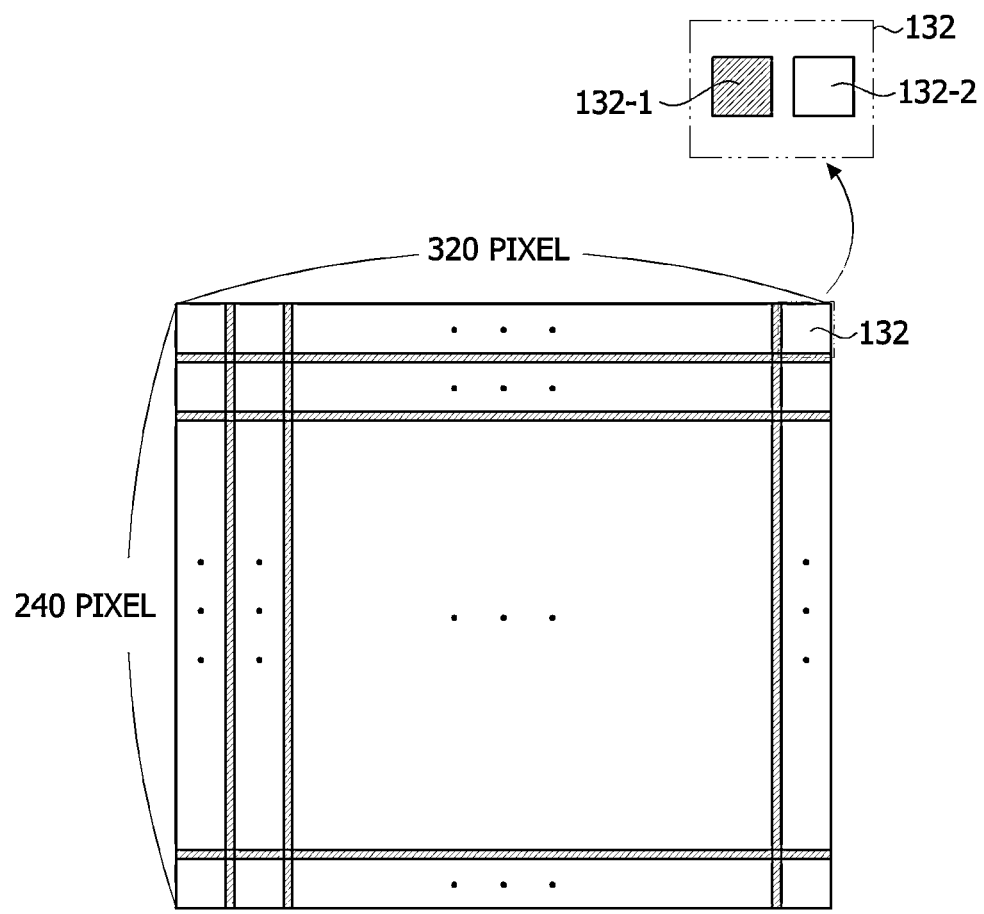
FIG. 5 is a view for explaining an image sensor of a ToF camera module according to an embodiment of the present invention.
Figure 6:
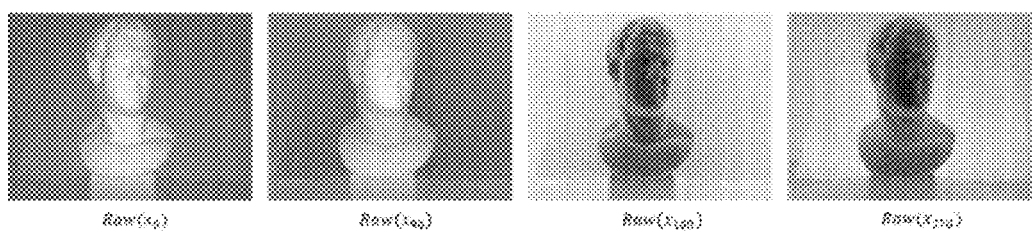
FIG. 6 is four phase images that may be obtained from a ToF camera module according to an embodiment of the present invention.
Figure 7:
FIG. 7 is a ToF IR image that may be obtained from the phase image of FIG. 6.
Figure 8:
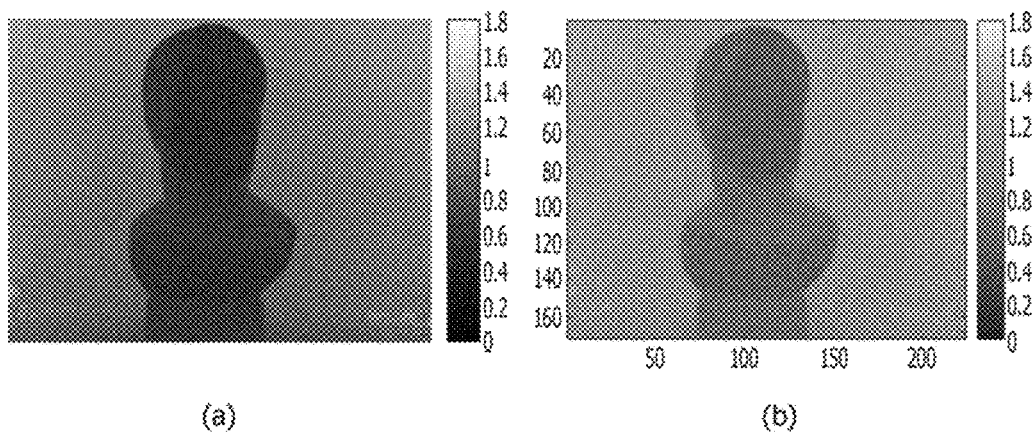
FIG. 8 is a depth image that may be obtained from the phase image of FIG. 6.

FIG. 1 is a block diagram of an image processing system according to an embodiment of the present invention, FIG. 2 is a block diagram of a ToF camera module according to an embodiment of the present invention, FIG. 3 is a view for explaining frequencies of an output light signal of the ToF camera module according to an embodiment of the present invention, FIG. 4 is a diagram illustrating a process of generating an electric signal according to an embodiment of the present invention, FIG. 5 is a view for explaining an image sensor of a ToF camera module according to an embodiment of the present invention, FIG. 6 is four phase images that may be obtained from a ToF camera module according to an embodiment of the present invention, FIG. 7 is a ToF IR image that may be obtained from the phase image of FIG. 6, FIG. 8 is a depth image that may be obtained from the phase image of FIG. 6.

Referring to FIG. 1, an image processing system 10 according to an embodiment of the present invention includes a ToF camera 100, an RGB camera 200, and an image processing apparatus 300.

The ToF camera 100 is one of devices capable of obtaining depth information. According to a ToF method, a distance to an object is calculated by measuring flight time, that is, the time that light is emitted and reflected.

The RGB camera 200 may be a general camera capable of photographing an RBG image.

The ToF camera 100 and the RGB camera 200 may be disposed in one device, for example, one mobile device so as to photograph the same area.

In addition, the image processing apparatus 300 may be connected to the ToF camera 100 and the RGB camera 200, and obtain a 3D image by fusing the ToF image obtained from the ToF camera 100 and the RGB image obtained from the RGB camera 200.

Here, the image processing apparatus 300 is shown to be disposed adjacent to the ToF camera 100 and the RGB camera 200 in the image processing system 10, but is not limited thereto, and it may be remotely disposed with the ToF camera 100 and the RGB camera 200. Alternatively, some functions of the image processing apparatus 300 may be included in the ToF camera 100 and the RGB camera 200.

Referring to FIG. 2, the ToF camera module 100 includes an illumination unit 110, a lens unit 120, an image sensor unit 130, and an image control unit 140.

The illumination unit 110 generates an output light signal and then irradiates an object. In this case, the illumination unit 110 may generate and output the output light signal in the form of a pulse wave or a continuous wave. The continuous wave may be in the form of a sinusoid wave or a square wave. By generating the output light signal in the form of a pulse wave or a continuous wave, the ToF camera module 100 may detect a phase difference between an output light signal output from the illumination unit 110 and an input light signal input to the ToF camera module 100 after being reflected from an object. Herein, the output light may refer to light that is output from the illumination unit 110 and incident on the object, and the input light may refer to light that is output from the illumination unit 110 and incident on the object, reaches the object and is reflected from the object and then input to the ToF camera module 100. From the point of view of the object, the output light may be incident light and the input light may be reflected light.

The illumination unit 110 irradiates the generated output light signal to the object during a predetermined integration time. Here, the integration time means one frame cycle. When generating a plurality of frames, an established integration time is repeated. For example, when the ToF camera module 100 photographs an object at 20 FPS, the integration time is ¹⁄₂₀ (sec). In addition, when 100 frames are generated, the integration time may be repeated 100 times.

The illumination unit 110 may generate a plurality of output light signals having different frequencies. The illumination unit 110 may sequentially repeatedly generate a plurality of output light signals having different frequencies. Alternatively, the illumination unit 110 may simultaneously generate a plurality of output light signals having different frequencies.

Referring to FIG. 3, the illumination unit 110 may control the first half of the integration time to generate an output light signal with a frequency $f_1$, and control the other half of the integration time to generate an output light signal with a frequency $f_2$.

According to another embodiment, the illumination unit 110 may control some of a plurality of light emitting diodes to generate an output light signal having a frequency $f_1$, and control the remaining light emitting diodes to generate an output light signal having a frequency $f_2$.

To this end, the illumination unit 110 may include a light source 112 that generates light and a light modulator 114 that modulates the light.

First, the light source 112 generates light. The light generated by the light source 112 may be infrared rays having a wavelength of 770 to 3000 nm, or visible rays having a wavelength of 380 to 770 nm. The light source 112 may use a light emitting diode (LED), and may have a shape in which a plurality of light emitting diodes is arranged according to a predetermined pattern. Furthermore, the light source 112 may include an organic light emitting diode (OLED) or a laser diode (LD). Alternatively, the light source 112 may be a vertical cavity surface emitting laser (VCSEL). The VCSEL is one of laser diodes for converting an electrical signal into a light signal, and may use a wavelength of about 800 to 1000 nm, for example, about 850 nm or about 940 nm.

The light source 112 generates an output light signal in the form of a pulse wave or a continuous wave by repeatedly turning on/off at a predetermined time interval. The predetermined time interval may be the frequency of the output light signal. Turning on/off of the light source may be controlled by the light modulator 114.

The light modulator 114 controls turn-on or turn-off of the light source 112 so that the light source 112 generates an output light signal in the form of a continuous wave or a pulse wave. The light modulator 114 may control the light source 112 to generate an output light signal in the form of a continuous wave or a pulse wave through a frequency modulation or pulse modulation.

Meanwhile, the lens unit 120 collects the input light signal reflected from the object and transmits it to the image sensor unit 130.

Referring back to FIG. 2, the image sensor unit 130 generates an electrical signal using the input light signal collected through the lens unit 120.

The image sensor unit 130 is synchronized with an on/off period of the illumination unit 110 to absorb the input light signal. Specifically, the image sensor unit 130 may absorb the output light signal output from the illumination unit 110 at in-phase and out-phase, respectively. That is, the image sensor unit 130 may repeatedly perform a process of absorbing an incident light signal at a time when the light source is turned on and absorbing an incident light signal at a time when the light source is turned off.

Next, the image sensor unit 130 may use a plurality of reference signals having different phase differences to generate an electric signal corresponding to each reference signal. The frequency of the reference signal may be set equal to the frequency of the output light signal output from the illumination unit 110. Accordingly, when the illumination unit 110 generates an output light signal at a plurality of frequencies, the image sensor unit 130 generates an electric signal using a plurality of reference signals corresponding to each frequency. The electrical signal may include information on an amount of charge or voltage corresponding to each reference signal.

As shown in FIG. 4, there may be four reference signals $C_1$ to $C_4$ according to an embodiment of the present invention. Each of the reference signals $C_1$ to $C_4$ has the same frequency as the output light signal, but may have a phase difference of 90 degrees from each other. One reference signal $C_1$ of the four reference signals may have the same phase as the output light signal. The phase of the input light signal is delayed by a distance in which the output light signal is incident on the object and reflected back. The image sensor unit 130 mixes the input light signal and each reference signal, respectively. Then, the image sensor unit 130 may generate an electric signal corresponding to a shaded portion in FIG. 4 for each reference signal.

In another embodiment, when the output light signal is generated at a plurality of frequencies during an integration time, the image sensor unit 130 absorbs the input light signal according to the plurality of frequencies. For example, it is assumed that the output light signal is generated at frequencies $f_1$ and $f_2$, and a plurality of reference signals has a phase difference of 90 degrees. Then, since the incident light signal also has the frequencies $f_1$ and $f_2$, four electrical signals may be generated through an input light signal having a frequency of $f_1$ and four reference signals corresponding to this signal. In addition, four electrical signals may be generated through an input light signal having a frequency of $f_2$ and four reference signals corresponding thereto. Thus, a total of 8 electrical signals may be generated.

The image sensor unit 130 may be configured in a structure in which a plurality of pixels is arranged in a grid form. The image sensor unit 130 may be a complementary metal oxide semiconductor (CMOS) image sensor, or may be a charge coupled device (CCD) image sensor. In addition, the image sensor unit 130 may include a ToF sensor that receives infrared ray light reflected from a subject and measures a distance using time or phase difference.

Referring to FIG. 5, for example, in the case of the image sensor 130 having a resolution of 320×240, 76,800 pixels are arranged in a grid form. In this case, a predetermined interval may be formed between the pluralities of pixels as in the shaded portion of FIG. 5. In the embodiment of the present invention, it is described as 1 pixel including a predetermined interval adjacent to the pixel.

According to an embodiment of the present invention, each pixel 132 may include a first light receiving unit 132-1 including a first photodiode and a first transistor, and a second light receiving unit 132-2 including a second photodiode and a second transistor.

The first light receiving unit 132-1 receives an input light signal at the same phase as the waveform of the output light. In other words, when the light source is turned on, the first photodiode is turned on to absorb the input light signal. And, when the light source is turned off, the first photodiode is turned off to stop absorbing the input light signal. The first photodiode converts the absorbed input light signal into current and transfers it to the first transistor. The first transistor converts the transferred current into an electric signal and outputs it.

The second light receiving unit 132-2 receives an input light signal at a phase opposite to the waveform of the output light. In other words, when the light source is turned on, the second photodiode is turned off to absorb the input light signal. And, when the light source is turned off, the second photodiode is turned on to stop absorbing the input light signal. The second photodiode converts the absorbed input light signal into current and transfers it to the second transistor. The second transistor converts the transferred current into an electric signal.

Accordingly, the first light receiving unit 132-1 may be referred to as an in-phase receiving unit, and the second light receiving unit 132-2 may be referred to as an out-phase receiving unit. As such, when the first light receiving unit 132-1 and the second light receiving unit 132-2 are activated with a time difference, the difference occurs in the amount of received light depending on the distance to the object. For example, if the object is right in front of the TOF camera module 100 (that is, when the distance is 0), since the time it takes to reflect from the object after the light is output from the illumination unit 110 is 0, the on/off period of the light source becomes a light receiving period as it is. Accordingly, only the first light receiving unit 132-1 receives the light, and the second light receiving unit 132-2 does not receive the light. As another example, if the object is located at a predetermined distance away from the ToF camera module 100, since it takes time to be reflected from the object after the light is output from the illumination unit 110, the on/off period of the light source is different from the light receiving period. Thus, the difference occurs in the amount of light received by the first light receiving unit 132-1 and the second light receiving unit 132-2. That is, the distance to the object may be calculated using the difference between the amount of light input to the first light receiving unit 132-1 and the second light receiving unit 132-2.

Referring back to FIG. 2, the image control unit 140 calculates a phase difference between the output light and the input light using the electric signal received from the image sensor unit 130 and calculates the distance between the object and the ToF camera module 100 using the phase difference.

Specifically, the image control unit 140 may calculate a phase difference between the output light and the input light using information on the amount of charge of the electric signal.

As described above, four electrical signals may be generated for each frequency of the output light signal. Accordingly, the image control unit 140 may calculate the phase difference to between the output light signal and the input light signal by using Equation 1 below.

$$t_d = \arctan\left(\frac{Q_3 - Q_4}{Q_1 - Q_2}\right) \quad \text{(Equation 1)}$$

Here, $Q_1$ to $Q_4$ are the amounts of the charge for the respective four electric signals. $Q_1$ is the electric charge amount of the electric signal corresponding to the reference signal of the same phase as the output light signal. $Q_2$ is the amount of charge in the electric signal corresponding to the reference signal whose phase is 180 degrees slower than the output light signal. $Q_3$ is the amount of charge in the electric signal corresponding to the reference signal whose phase is 90 degrees slower than the output light signal. $Q_4$ is the amount of charge in the electric signal corresponding to the reference signal whose phase is 270 degrees slower than the output light signal.

Then, the image control unit 140 may calculate the distance between the object and the ToF camera module 100 by using the phase difference between the output light signal and the input light signal. In this case, the image control unit 140 may calculate the distance d between the object and the ToF camera module 100 using Equation 2 below.

$$d = \frac{c}{2f} \frac{t_d}{2\pi} \quad \text{(Equation 2)}$$

Here, c is the speed of light and f is the frequency of the output light.

According to an embodiment of the present invention, a ToF IR image and a depth image may be obtained from the ToF camera module 100.

More specifically in this regard, as illustrated in FIG. 6, raw images for four phases may be obtained from the ToF camera module 100 according to an embodiment of the present invention. Here, the four phases may be 0°, 90°, 180°, and 270°, the raw image for each phase may be an image consisting of digitized pixel values for each phase and may be used interchangeably with a phase image and phase IR image, etc.

If calculated as in Equation 3 below using the four phase images of FIG. 6, an amplitude image, which is the ToF IR image of FIG. 7, may be obtained.

Amplitude =

$$\frac{1}{2}\sqrt{(\text{Raw}(x_{90}) - \text{Raw}(x_{270}))^2 + (\text{Raw}(x_{180}) - \text{Raw}(x_0))^2} \quad \text{(Equation 3)}$$

Here, $\text{Raw}(x_0)$ may be a data value for each pixel received by the sensor at phase 0°, $\text{Raw}(x_{90})$ may be a data value for each pixel received by the sensor at phase 90°, $\text{Raw}(x_{180})$ may be a data value for each pixel received by the sensor at phase 180°, and $\text{Raw}(x_{270})$ may be a data value for each pixel received by the sensor in phase 270°.

Alternatively, if calculated as in Equation 4 below using the four phase images of FIG. 6, an intensity image, which is another ToF IR image, may be obtained.

$$\text{Intensity} = |\text{Raw}(x_{90}) - \text{Raw}(x_{270})| + |\text{Raw}(x_{180}) - \text{Raw}(x_0)| \quad \text{(Equation 4)}$$

Here, $\text{Raw}(x_0)$ may be a data value for each pixel received by the sensor at phase 0°, $\text{Raw}(x_{90})$ may be a data value for each pixel received by the sensor at phase 90°, $\text{Raw}(x_{180})$ may be a data value for each pixel received by the sensor at phase 180°, and $\text{Raw}(x_{270})$ may be a data value for each pixel received by the sensor in phase 270°.

As such, the ToF IR image is an image generated by a process of subtracting two of the four phase images from each other, and in this process, background light may be removed. As a result, only the signal in the wavelength band output from the light source remains in the ToF IR image, thereby increasing the IR sensitivity to the object and reducing noise significantly.

Herein, the ToF IR image may refer to an amplitude image or an intensity image, and the intensity image may be used interchangeably with a confidence image. As shown in FIG. 7, the ToF IR image may be a gray image.

Meanwhile, if calculated as in Equation 3 below using the four phase images of FIG. 6, the depth image of FIG. 8 may also be obtained.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{(Equation 5)}$$

$$\text{Depth} = \frac{1}{2f}c\frac{\text{Phase}}{2\pi} \quad (c = \text{speed of light}) \quad \text{(Equation 6)}$$

Figure 9:
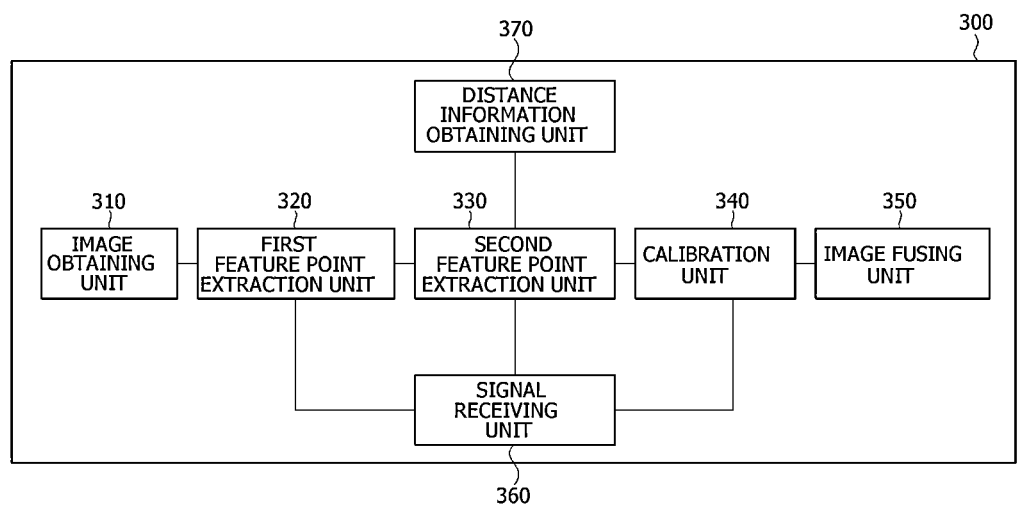
FIG. 9 is a block diagram of an image processing apparatus included in an image processing system according to an embodiment of the present invention.

FIG. 9 is a block diagram of an image processing apparatus included in an image processing system according to an embodiment of the present invention.

Referring to FIG. 9, the image processing apparatus 300 includes an image obtaining unit 310 for obtaining a ToF image and an RGB image from the ToF camera 100 and a RGB camera 200, respectively, a first feature point extraction unit 320 for extracting a first RGB feature point from the RGB image and extracting a first ToF feature point from the ToF image, a second feature point extraction unit 330 for extracting a second RGB feature point and a second ToF feature point from the first RGB feature point and the first ToF feature point, a calibration unit 340 for calibrating the RGB image and the ToF image using the second RGB feature point and the second ToF feature point, and an image fusing unit 350 for generating a 3D color image by fusing the calibrated RGB image and the ToF image. The image processing apparatus 300 according to an embodiment of the present invention may further include a signal receiving unit 360 for receiving signals which trigger the operations for the first feature point extraction unit 320, the second feature point extraction unit 330 and the calibration unit 340, and a distance information obtaining unit 370 for obtaining distance information of an object from the ToF camera 100 or the RGB camera 200.

As described above, the TOF image that may be obtained from the ToF camera 100 may be a ToF IR image and a depth image. Here, the ToF IR image may be an amplitude image or an intensity image generated from the IR image for four phases of 0°, 90°, 180°, and 270°. The amplitude image may be generated as described in FIGS. 6 to 7 and Equations 3 and 4. The image fusing unit 350 may generate a 3D color image including both color information and depth information by fusing and rendering the RGB image and the depth image.

Meanwhile, in order for the image fusing unit 350 to fuse the depth image obtained from the ToF camera 100 and the RGB image obtained from the RGB camera 200 to obtain a high-quality 3D color image, a precise alignment between the ToF camera 100 and the RGB camera 200 is required.

When the ToF camera 100 and the RGB camera 200 are mounted in one device, for example, one mobile device, after assembly of the mobile device and before being sold on the market, calibrations between the ToF camera 100 and the RGB camera 200 need to be performed in advance.

Figure 10:
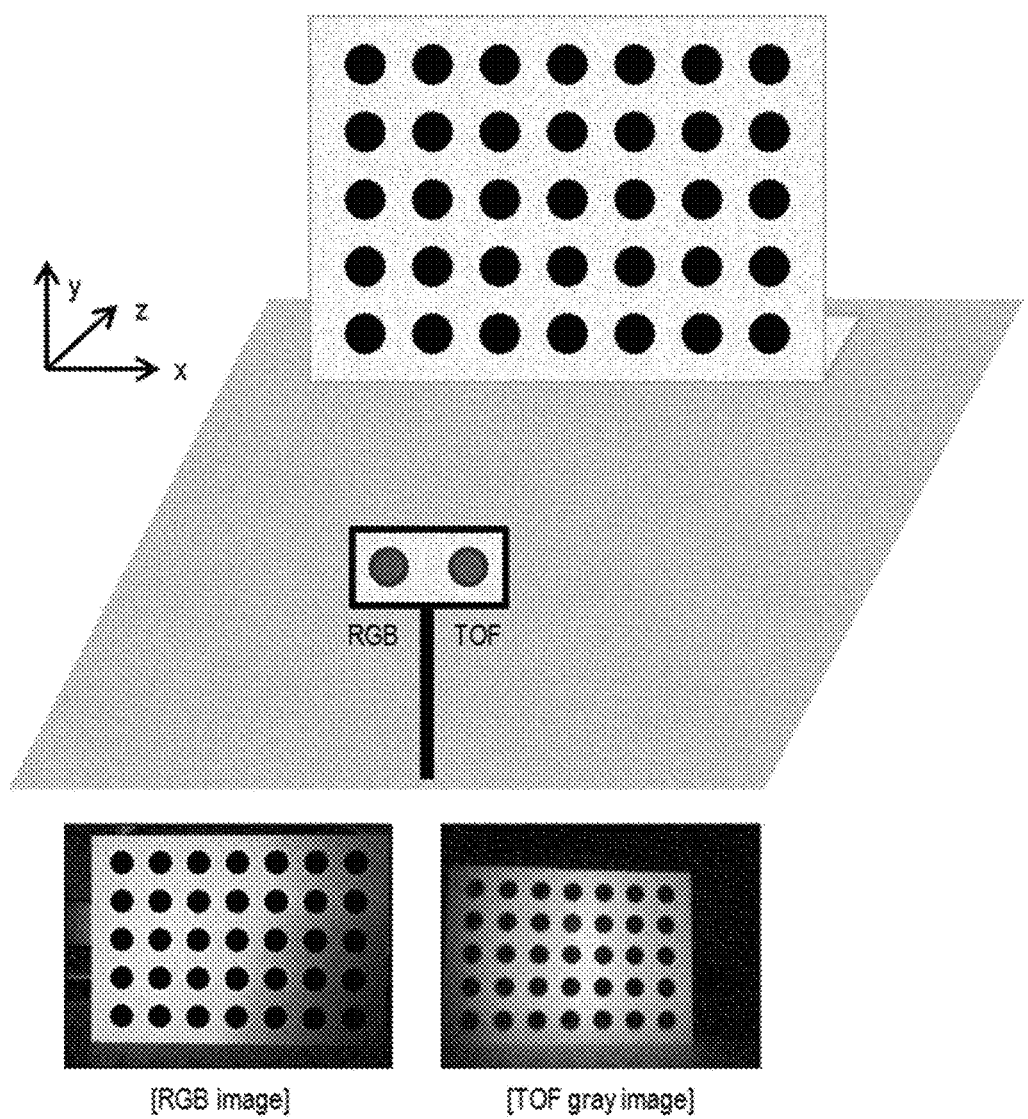
FIGS. 10 to 12 are diagrams for explaining a calibration method between a ToF camera and an RGB camera.
Figure 11:
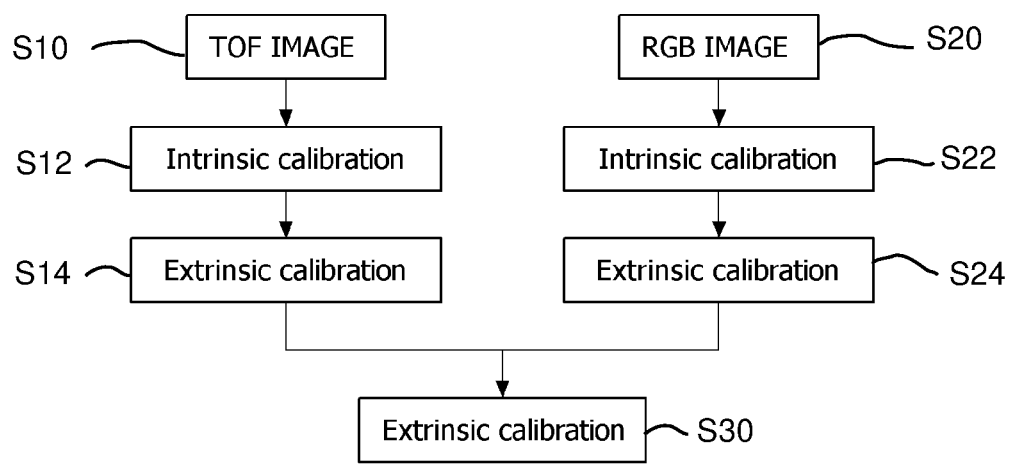
Figure 12:
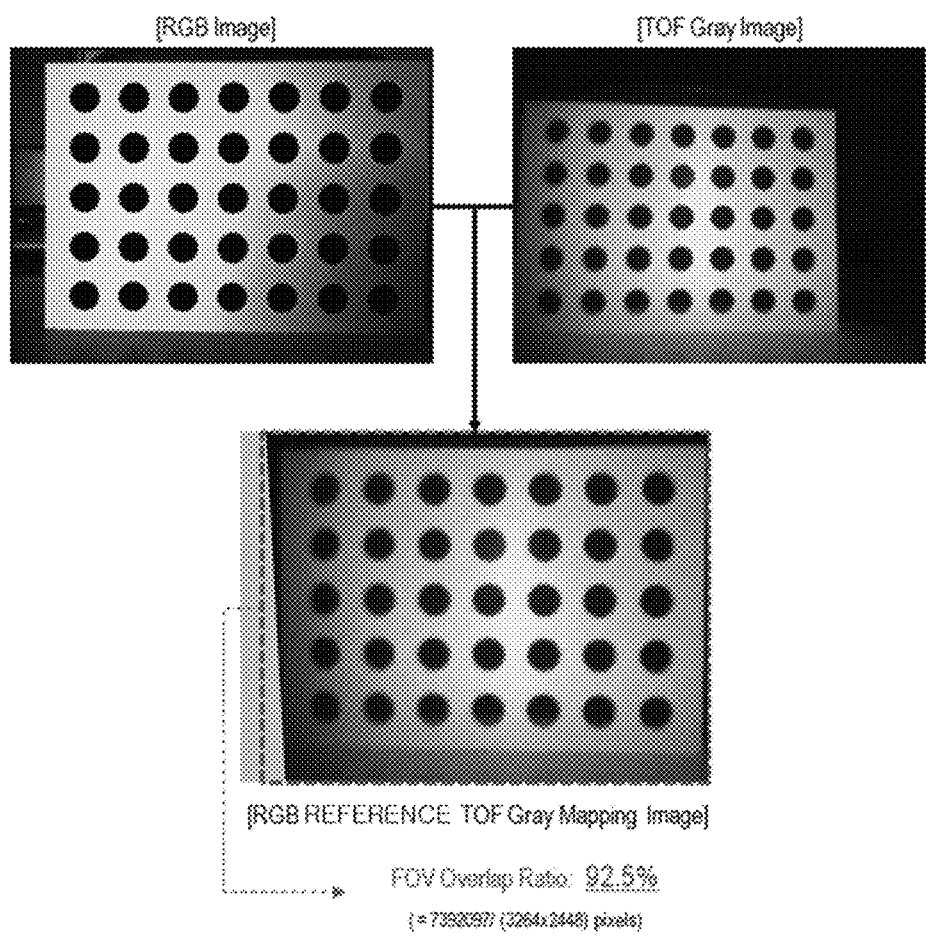

FIGS. 10 to 12 are diagrams for explaining a calibration method between a ToF camera and an RGB camera.

Referring to FIGS. 10 to 11, a chart of a predetermined pattern is arranged on the front of the ToF camera 100 and the RGB camera 200, and the ToF camera 100 and the RGB camera 200 each obtain a pattern image by photographing the same chart (S10 and S20).

Each of the cameras may extract parameters inside the camera that is, between a lens and a sensor through intrinsic calibration (S12 and S22) from the obtained pattern image.

Here, the extracted parameters may be a focal length, an optical center, and distortion correction coefficients.

In addition, each of the cameras may extract parameters between the camera and the chart through extrinsic calibration from the obtained pattern image (S14 and S24). The parameters between the camera, which is a ToF camera, and the chart may be represented by extrinsic parameters, X, Y, Z/Pitch/Roll/Yaw, and a reprojection error, and the parameters between the camera, which is a RGB camera, and the chart may be represented by the extrinsic parameters, X, Y, Z/Pitch/Roll/Yaw, and the reprojection error.

Further, using the parameters extracted by each of the cameras through the intrinsic calibration and the parameters extracted through the extrinsic calibration, an extrinsic calibration between two cameras may be performed, and parameters related to a position correlation between the two cameras may be extracted (S30). Here, the parameters related to the position correlation between the two cameras may be represented by X, Y, Z/Pitch/Roll/Yaw, and the reprojection error. For example, a result of mapping a ToF image based on a RGB image may be performed as shown in Table 1 below, and the result may be expressed as shown in FIG. 12.

| Parameter | TOF | RGB | RGB Ref. TOF mapping |
|---|---|---|---|
| Pitch (°) | 90.9761 | 86.5407 | 4.37048 |
| Roll (°) | 0.42211 | 0.92037 | −0.23463 |
| Yaw (°) | −1.5376 | 3.40775 | −5.00505 |
| X (mm) | −6.2585 | 24.0698 | −29.9763 |
| Y(mm) | 130.25 | 133.406 | 2.33581 |
| Z (mm) | −358.023 | −352.497 | −7.49864 |
| Reprojection Error (pixels) | 0.1543 | 1.0719 | 4.5120 |

In an embodiment of the present invention, after the ToF camera 100 and the RGB camera 200 are assembled in one device and before being sold on the market, for example, at the manufacturing stage, it may be assumed that the calibration is performed in advance using the method illustrated in FIGS. 10 and 12, and that calibration data including X, Y, Z/Pitch/Roll/Yaw and the reprojection error is pre-stored. Herein, the calibration data is pre-stored in the image processing apparatus 300 as an example, but is not limited thereto, and the calibration data may be stored in advance in an apparatus in which the image processing system 10 according to an embodiment of the present invention is mounted, for example a mobile device, or may be stored in a remote storage in advance. According to an embodiment of the present invention, the image processing apparatus 300 may perform the calibration between the ToF camera 100 and the RGB camera 200 in real time. Accordingly, even if a distortion between the ToF camera 100 and the RGB camera 200 is occurred depending on the use of the apparatus, a high-quality 3D color image may be obtained without visiting a service center individually.

For convenience of explanation, in this specification, after assembly of the ToF camera and the RGB camera in the apparatus and before sold on the market, the calibration performed in advance may be referred to as offline calibration or process calibration. In addition, during use by the user after sold on the market, the calibration performed in real time in the image processing apparatus 300 may be referred to as real-time calibration, kinetic calibration, dynamic calibration, and the like. For convenience of explanation, the image processing system of the present invention is described as an example that is mounted in a mobile device, but is not limited thereto, and the embodiment of the present invention may be applied to all devices that fuses a 3D color image by simultaneously mounting the RGB camera and the ToF camera.

Figure 13:
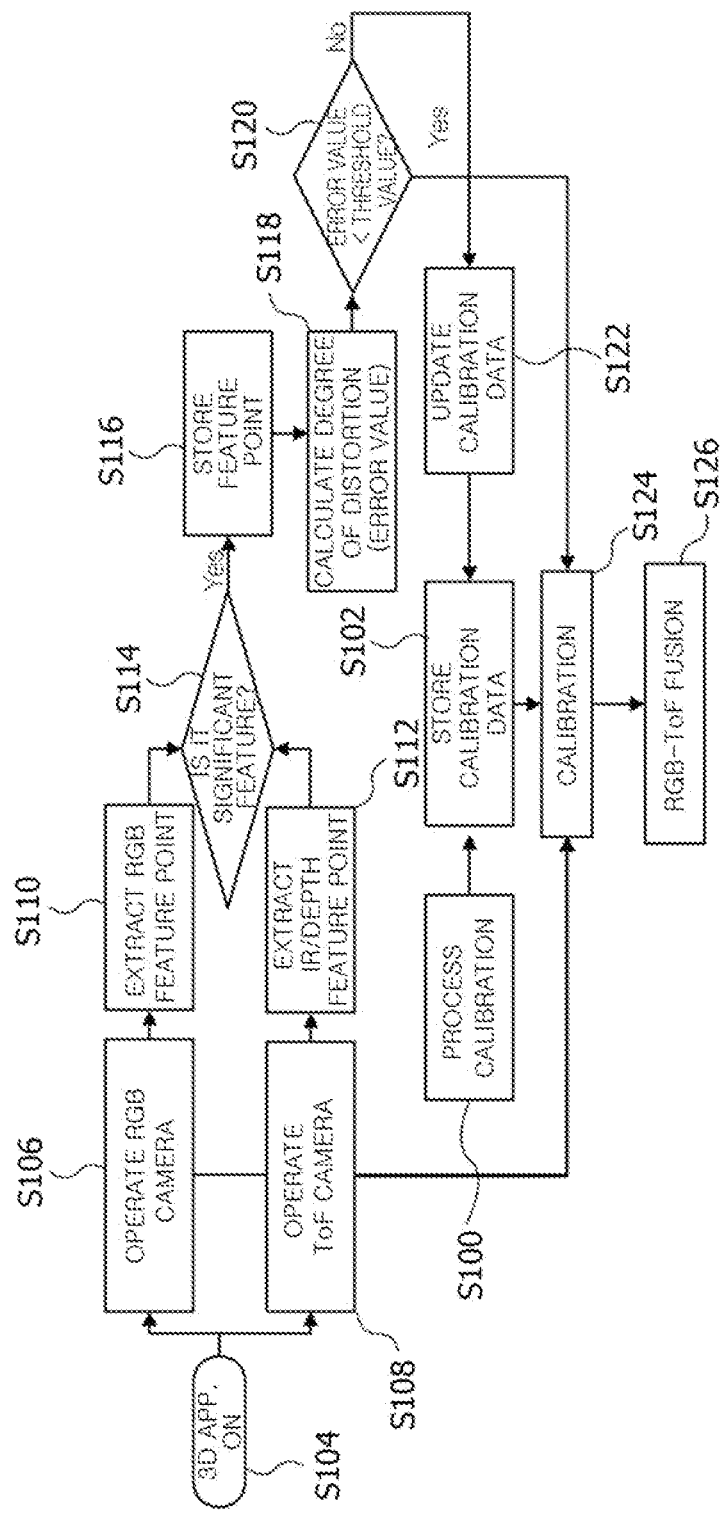
FIG. 13 is a flow chart showing an image processing method of the image processing system according to an embodiment of the present invention.

FIG. 13 is a flow chart showing an image processing method of the image processing system according to an embodiment of the present invention;

Referring to FIG. 13, offline calibration between the ToF camera 100 and the RGB camera 200 may be performed in advance before the product is sold on the market (S100), as described above, and calibration data may be stored in the image processing apparatus 300 in advance (S102). Here, the calibration data may include X, Y, Z/Pitch/Roll/Yaw, and a reprojection error.

When an application related to a 3D image in the mobile device is driven (S104), the RGB camera 200 and the ToF camera 100 start their operations, respectively, and the image obtaining unit 310 in the image processing apparatus 300 obtains the RGB image and the ToF image (S106, S108). Here, the ToF image may include a ToF IR image and a depth image generated from IR images for four phases, as described above.

Next, the first feature point extraction unit 320 in the image processing apparatus 300 extracts the first RGB feature point from the RGB image (S110), and extracts the first ToF feature point from the ToF image (S112). Here, the first RGB feature point may be extracted using at least one of edge information, shape information, size information, and center point information of the object in the RGB image, and the first ToF feature point may be extracted using at least one of edge information, shape information, size information and center point information. Here, the first ToF feature point may include at least one of a feature point extracted from a ToF IR image and a feature point extracted from a depth image. Various known methods for extracting feature points from an image may be applied to steps S110 and S112.

Next, the second feature point extraction unit 320 in the image processing apparatus 300 matches the first RGB feature point and the first ToF feature point, and extracts a second RGB feature point and a second ToF feature point having the correlation between the first RGB feature point and the feature point of the first ToF greater than or equal to a predetermined value (S114). Here, if the correlation between the first RGB feature point and the first ToF feature point is greater than or equal to a predetermined value, since it means feature points that may be extracted from both the RGB image and the ToF image, it is possible to infer the degree of distortion between the RGB camera 200 and the ToF camera 100 by comparing the extracted feature points. Accordingly, in the present specification, the second RGB feature point and the second ToF feature point may be referred to as significant feature points. Here, the second RGB feature point and the second ToF feature point may be extracted by matching the first RGB feature point and the first ToF feature point of the ToF IR image, or may be extracted by matching the first RGB feature point and the first ToF feature point of the depth image, or may be extracted by matching the first RGB feature point, the first ToF feature point of the ToF IR image, and the first ToF feature point of the depth image. Here, the ToF IR image is advantageous for extracting the edge component of an object as a feature point, and the depth image is advantageous for classifying objects with the same material and color as feature points when they are at different distances.

Figure 14:
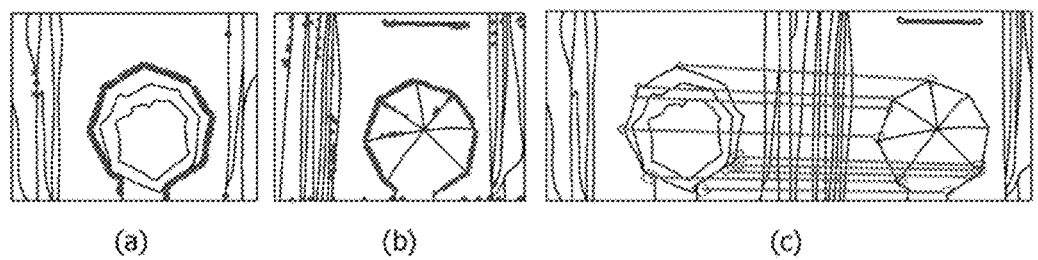
FIG. 14 is a diagram for explaining a method of extracting a second RGB feature point and a second ToF feature point from a first RGB feature point and a first ToF feature point in an embodiment of the present invention.

In step S114, various known methods for matching feature points between an RGB image and a ToF image, for example, a SIFT algorithm or a SURF algorithm, may be applied. FIG. 14 is a diagram for explaining a method of extracting a second RGB feature point and a second ToF feature point from a first RGB feature point and a first ToF feature point in an embodiment of the present invention. When the feature points of the depth image indicated in red in FIG. 14(a) and the feature points of the RGB image indicated in red in FIG. 14(b) are matched using the SIFT algorithm or the SURF algorithm, a second RGB feature point and a second ToF feature point having the correlation greater than or equal to a predetermined value may be extracted, as shown in FIG. 14(c).

Next, the image processing apparatus 300 stores information on the second RGB feature point and the second ToF feature point extracted from the second feature point extraction unit 320 (S116), and then the calibration unit 340 calculates an error value between the second RGB feature point and the second ToF feature point (S118). Here, the error value may be calculated using at least one of a X value, a Y value, a Z value, a Pitch value, a Roll value, a Yaw value, and a reprojection error of the second RGB feature point and at least one of a X value, a Y value, a Z value, a Pitch value, a Roll value, a Yaw value and a reprojection error of the second ToF feature point. The error value may refer to a degree of distortion between the RGB image and the ToF image, and may include at least one of the X value, the Y value, the Z value, the Pitch value, the Roll value, the Yaw value, and the reprojection error.

Further, the calibration unit 340 in the image processing apparatus 300 may compare the error value of the step S118 with a threshold value (S120). In this case, if the error value is greater than the threshold value, the calibration unit 340 updates the error value with new calibration data (S122), and calibrates the RGB image and the ToF image using the updated calibration data (S124).

In addition, the image fusing unit 350 in the image processing apparatus 300 generates a 3D color image by fusing the calibrated RGB image and the ToF image (S126).

As such, according to an embodiment of the present invention, even if the device with the ToF camera 100 and the RGB camera 200 is distorted due to various causes while using the device, the calibration may be automatically performed in real time without visiting a service center.

Meanwhile, if a photographing range of the RGB camera and the ToF camera is a long distance, objects in the far distance may also be photographed together in the RGB image and the ToF image, and accordingly, the number of the first RGB feature point and the first ToF feature point may be increased innumerably and the accuracy may also be degraded.

Therefore, according to an embodiment of the present invention, distance information may be further used to extract the second RGB feature point and the second ToF feature point in step S114. For example, it is possible to extract the second RGB feature point and the second ToF feature point by comparing only the correlation of feature points within a predetermined distance, for example, 1 m from the camera among the first RGB feature point and the first ToF feature point. Thus, in addition to improving the accuracy of significant feature points, it is possible to significantly reduce the amount of computation for calculating the correlation between the first RGB feature point and the first ToF feature point.

To this end, the distance information may be obtained from a distance information obtaining unit 370 of the image processing apparatus 300. In this case, the distance information obtaining unit 370 may be connected to the ToF camera 100 to obtain the distance information of an object in the depth image from the ToF camera 100. Alternatively, the distance information obtaining unit 370 may be connected to the image obtaining unit 310 in the image processing apparatus 300 and may directly extract the distance of the object from the depth image received from the image obtaining unit 310.

Figure 15:
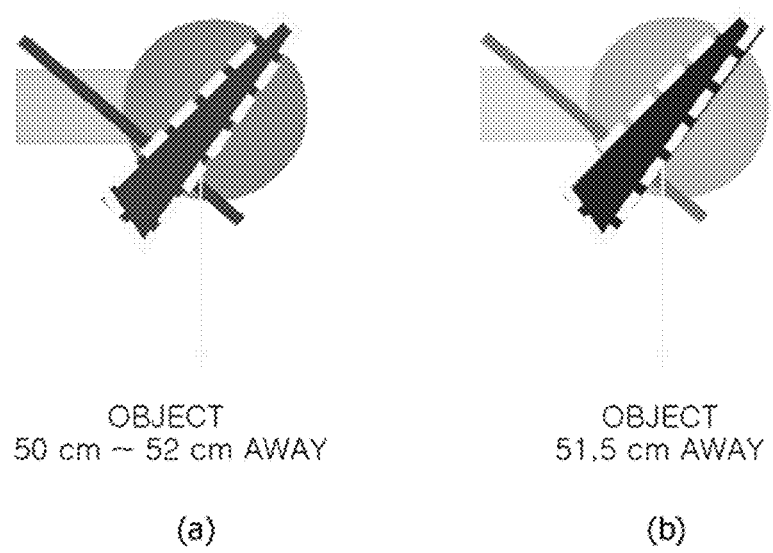
FIG. 15 is a diagram for explaining a method of extracting a second RGB feature point and a second ToF feature point by using distance information in an embodiment of the present invention.

Further, in a case where there are many similar patterns or shapes within the photograph range of a RGB camera and a ToF camera, it may be difficult to ensure that one of the first RGB feature points of the RGB image and one of the first ToF feature points of the ToF image are the same object. Accordingly, according to an embodiment of the present invention, the first RGB feature point may be extracted only for objects whose distance to the camera in the RGB image is within a predetermined range, as shown in FIG. 15(a), while the first ToF feature point may be extracted only for objects whose distance to the camera in the ToF image is within the same or similar range as the predetermined range, as shown in FIG. 15(b). And then the second RGB feature point and the second ToF feature point may be extracted using the correlation between the first RGB feature point and the first ToF feature point. Alternatively, the first RGB feature points and the first ToF feature points are extracted from the entire range in the RGB image and the entire range in the ToF image, respectively, but it is also possible to extract the second RGB feature point and the second ToF feature point by using the correlation between the first RGB feature point in which the distance to the camera in the RGB image is within a predetermined range and the first ToF feature point in which the distance to the camera in the ToF image is within the same range as the predetermined range, among the extracted first RGB feature point and the first ToF feature points. Accordingly, the amount of computation may be significantly reduced, and the accuracy of significant feature points may be improved.

To this end, the distance information may be obtained from the distance information obtaining unit 370 of the image processing apparatus 300. The distance information of the ToF image may be obtained from the ToF camera 100 or extracted from the depth image as described above. The distance information of the RGB image may be obtained using an autofocusing (AF) function in the RGB camera 200. For example, a typical RGB camera 200 may include the autofocusing function, and positions of some components (e.g., a lens barrel) in the RGB camera 200 may be physically changed in order to focus between an object and a lens. The degree of movement of some components in the RGB camera 200 may vary depending on the distance between the object and the lens, and the movement of some components may be controlled by a voice coil motor (VCM) or the like. Here, the distance between the object and the lens may be inferred from the current applied to the VCM or Hall IC sensor information. The distance information obtaining unit 370 in the image processing apparatus 300 according to an embodiment of the present invention may obtain distance information of an object autofocused from the RGB camera 200.

As described above, if the significant feature points are extracted only for objects within a predetermined distance or within a predetermined range, the accuracy of the significant feature points may be improved, and also the computational amount may be significantly reduced.

Figure 16:
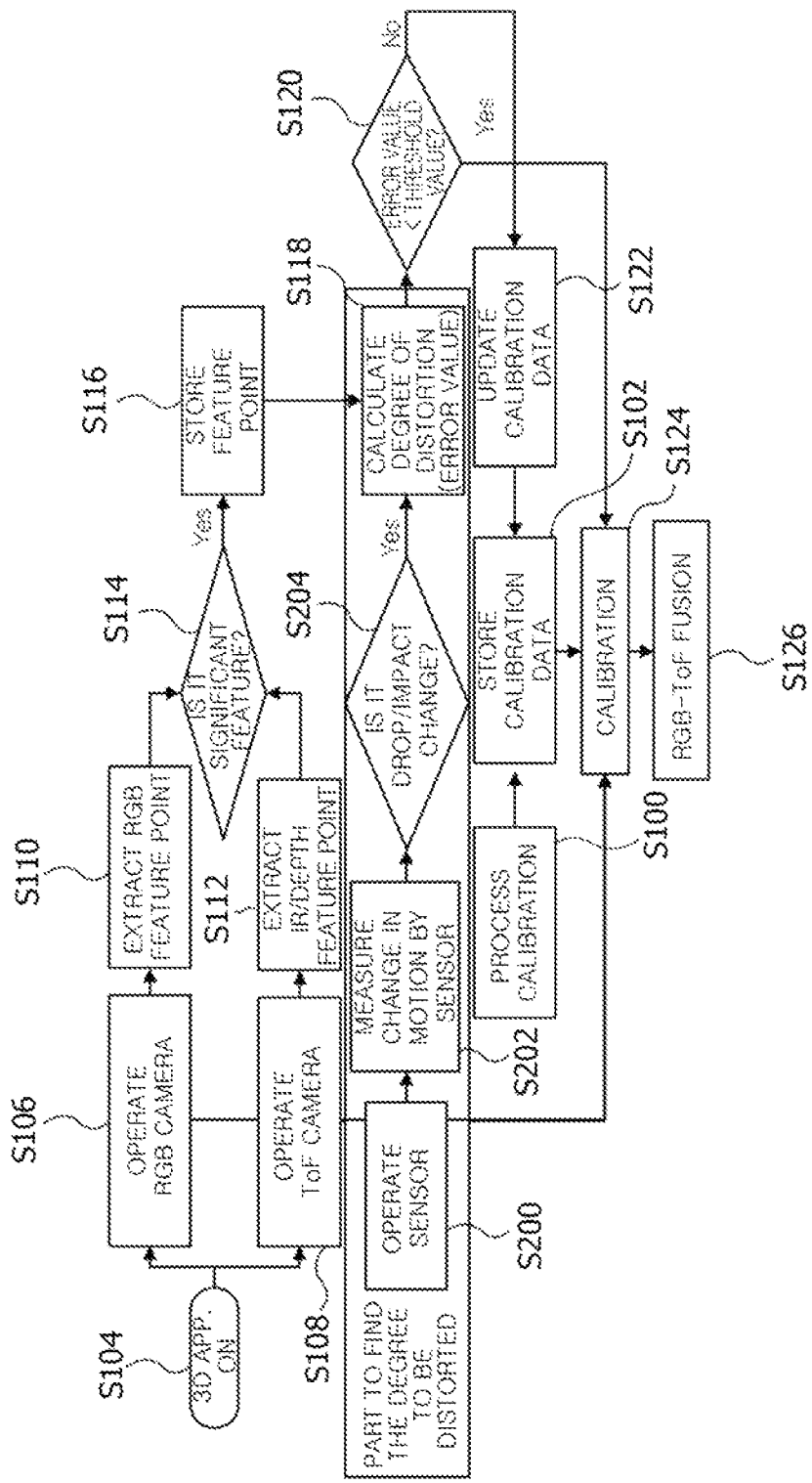
FIG. 16 is a flowchart showing an image processing method of an image processing system according to another embodiment of the present invention.

FIG. 16 is a flowchart showing an image processing method of an image processing system according to another embodiment of the present invention. For the same content as those described in FIGS. 13 to 15, the repeated descriptions will be omitted.

Referring to FIG. 16, steps S100 to S126 may be performed in the same manner as those described in connection with FIG. 13. Meanwhile, in an embodiment of the present invention, in step S118 of calculating an error value between the second RGB feature point and the second ToF feature point, a drop impact sensing signal may be further used. To this end, a sensor is operated (S200). Here, the sensor may be one embedded in a device, for example, a mobile device in which the ToF camera 100 and the RGB camera 200 are mounted, and may include at least one of an inertial sensor, an acceleration sensor, a gyro sensor, and a gravity sensor. The sensor may always be operated while the mobile device is turned on.

The sensor may measure a change in motion of the mobile device using the sensed information (S202), and when it is estimated that the mobile device has received a drop impact as a result of measuring the change in motion, the sensor may transmit the drop impact sensing signal to a signal receiving unit 360 in the image processing apparatus 300 (S204).

When the mobile device is subjected to a drop impact, a distortion between the ToF camera 100 and the RGB camera 200 may be occurred.

Accordingly, only when the image processing apparatus 300 receives the drop impact sensing signal through the signal receiving unit 360, the step S118 of calculating an error value between the second RGB feature point and the second ToF feature point may be performed.

Figure 17:
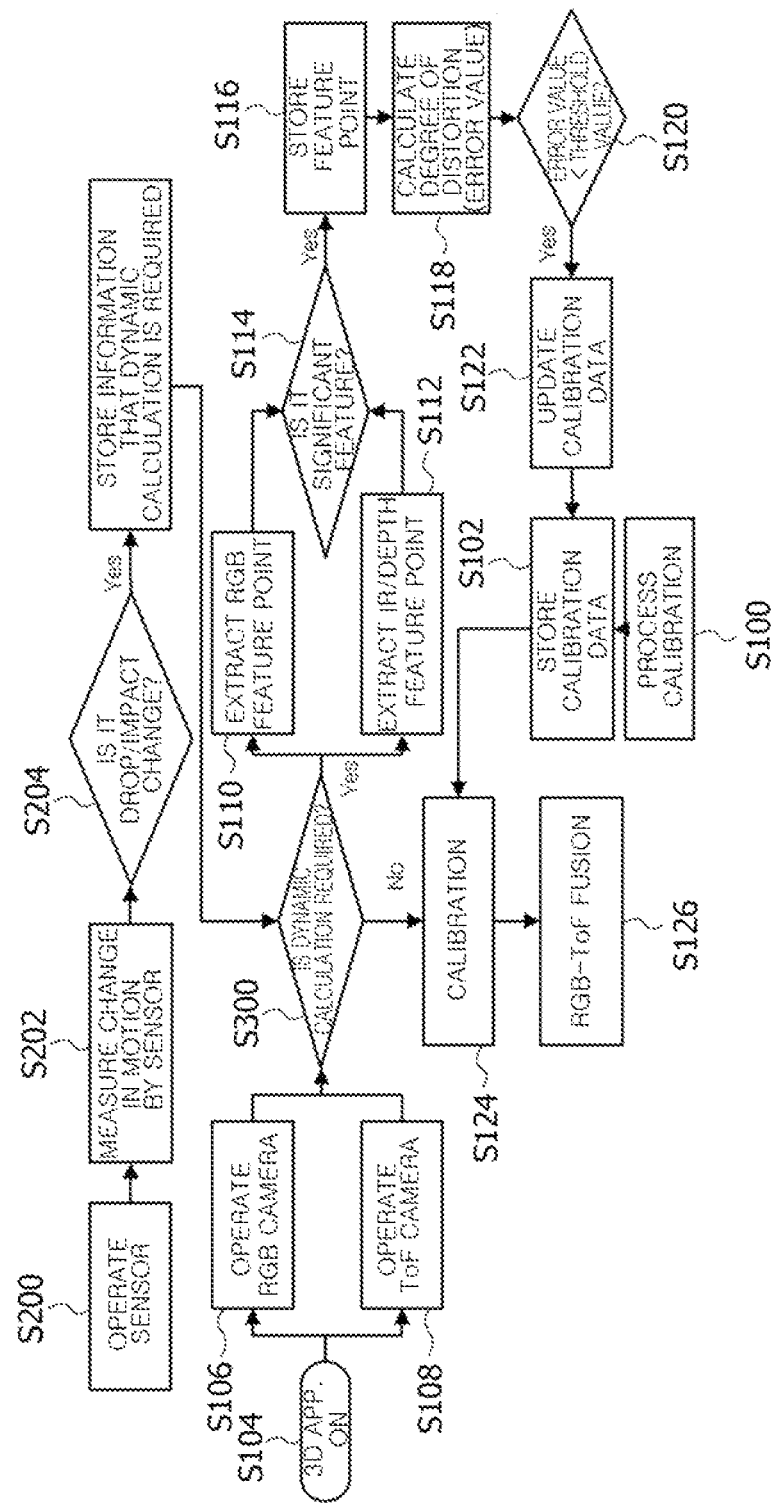
FIG. 17 is a flow chart illustrating an image processing method of an image processing system according to still another embodiment of the present invention.

FIG. 17 is a flow chart illustrating an image processing method of an image processing system according to still another embodiment of the present invention. For the same content as those described in FIGS. 13 to 16, the repeated descriptions will be omitted.

Referring to FIG. 17, steps S100 to S126 may be performed in the same manner as those described in connection with FIG. 13. In addition, steps S200 to S204 may be performed in the same manner as those described in connection with FIG. 16.

In this case, unlike the embodiments described in FIGS. 13 and 16, only when the image processing apparatus 300 receives a drop impact sensing signal through the signal receiving unit 360, it is determined that the calibration is necessary (S300), steps S110 and S112 of extracting the first RGB feature point from the RGB image and extracting the first ToF feature point from the ToF image may be performed.

Alternatively, although not shown, unlike the embodiments described in FIGS. 13 and 16, only when the image processing apparatus 300 receives a drop impact sensing signal through the signal receiving unit 360, it is determined that the calibration is necessary (S300), and step S114 of extracting the second RGB feature point and the second ToF feature point may also be performed by matching the first RGB feature point and the first ToF feature point.

As described above, only when the mobile device is subjected to a drop impact, in the case in which the steps S110, S112, S114, S118, and the like are triggered, the computational amount and load of the image processing apparatus 300 may be significantly reduced.

Meanwhile, according to another embodiment of the present invention in which an application for calibration request may be stored in the mobile device, and the steps S110 and S112, S114, S118, and the like may also be triggered only when the user makes a calibration request through a user interface.

Although embodiments have been described with reference to a number of illustrative embodiments thereof, it should be understood that numerous other modifications and embodiments may be devised by those skilled in the art that will fall within the spirit and scope of the principles of this disclosure. For example, each component specifically shown in the embodiment may be modified and implemented. And, the differences related to these modifications and applications should be construed as being included in the scope of the present invention defined in the appended claims.

The invention claimed is:

1. An image processing method of an image processing apparatus, comprising:
    obtaining a red-green-blue (RGB) image from an RGB camera;
    obtaining a time of flight (ToF) image from a ToF camera;
    extracting a first RGB feature point from the RGB image;
    extracting a first ToF feature point from the ToF image;
    matching the first RGB feature point and the first ToF feature point;
    extracting a second RGB feature point and a second ToF feature point having a correlation between the first RGB feature point and the first ToF feature point greater than or equal to a predetermined value;
    calculating an error value between the second RGB feature point and the second ToF feature point;
    updating pre-stored calibration data when the error value is greater than a threshold value, and calibrating the RGB image and the ToF image by using the updated calibration data; and
    generating a 3D color image by fusing the calibrated RGB and ToF images,
    wherein the second RGB feature point and the second ToF feature point are extracted by using feature points only within a predetermined distance from the ToF camera among the first RGB feature point and the first ToF feature point.

2. The image processing method according to claim 1, wherein the ToF image includes at least one of an IR image and a depth image.

3. The image processing method according to claim 2, wherein at least one of the IR image and the depth image is generated from IR images for four phases.

4. The image processing method according to claim 1, wherein the first RGB feature point is extracted by using at least one of edge information, shape information, size information, and center point information of an object in the RGB image, and the first ToF feature point is extracted by using at least one of edge information, shape information, size information, and center point information of an object in the ToF image.

5. The image processing method according to claim 1, wherein the calibration data includes a X value, a Y value, a Z value, a Pitch value, a Roll value and a Yaw value.

6. The image processing method according to claim 1, further comprising receiving a drop impact sensing signal from a sensor,
wherein the calculating the error value is performed when the drop impact sensing signal is received.

7. The image processing method according to claim 1, further comprising receiving a drop impact sensing signal from a sensor,
wherein the extracting the first RGB feature point from the RGB image and the extracting the first ToF feature point from the ToF image are performed when the drop impact sensing signal is received.

8. The image processing method according to claim 1, further comprising receiving a calibration request signal from a user interface,
wherein the extracting the first RGB feature point from the RGB image and the extracting the first ToF feature point from the ToF image are performed when the calibration request signal is received.

9. The image processing method according to claim 1, further comprising obtaining auto-focusing information of the RGB camera from the RGB camera,
wherein the second RGB feature point and the second ToF feature point are extracted by further using the auto-focusing information.

10. An image processing apparatus, comprising:
an image obtaining unit configured to obtain a red-green-blue (RGB) image from an RGB camera and a time of flight (ToF) image from a ToF camera;
a first feature point extraction unit configured to extract a first RGB feature point from the RGB image and a first ToF feature point from the ToF image;
a second feature point extraction unit configured to match the first RGB feature point and the first ToF feature point and extract a second RGB feature point and a second ToF feature point such that the correlation between the first RGB feature point and the first ToF feature point is equal to or greater than a predetermined value;
a calibration unit configured to calculate an error value between the second RGB feature point and the second ToF feature point, update pre-stored calibration data when the error value is greater than a threshold value, and calibrate the RGB image and the ToF image by using the updated calibration data; and
an image fusing unit configured to generate a 3D color image by fusing the calibrated RGB and ToF images,
wherein the second RGB feature point and the second ToF feature point are extracted by using feature points only within a predetermined distance from the ToF camera among the first RGB feature point and the first ToF feature point.

11. The image processing apparatus according to claim 10, wherein the ToF image includes at least one of an IR image and a depth image.

12. The image processing apparatus according to claim 11, wherein at least one of the IR image and the depth image is generated from IR images for four phases.

13. The image processing apparatus according to claim 10, wherein the first RGB feature point is extracted by using at least one of edge information, shape information, size information, and center point information of an object in the RGB image, and
the first ToF feature point is extracted by using at least one of edge information, shape information, size information, and center point information of an object in the ToF image.

14. The image processing apparatus according to claim 10, wherein the calibration data includes a X value, a Y value, a Z value, a Pitch value, a Roll value and a Yaw value.

15. The image processing apparatus according to claim 10, further comprising a signal receiving unit receiving a drop impact sensing signal from a sensor,
wherein the calculation unit calculates the error value when the drop impact sensing signal is received.

16. The image processing apparatus according to claim 10, further comprising a signal receiving unit receiving a drop impact sensing signal from a sensor,
wherein the first feature point extraction unit extracts the first RGB feature point from the RGB image and extracts the first ToF feature point from the ToF image when the drop impact sensing signal is received.

17. The image processing apparatus according to claim 10, further comprising a signal receiving unit receiving a calibration request signal from a user interface,
wherein the first feature point extraction unit extracts the first RGB feature point from the RGB image and extracts the first ToF feature point from the ToF image when the calibration request signal is received.

18. The image processing apparatus according to claim 10, further comprising an auto-focusing information obtaining unit obtaining auto-focusing information of the RGB camera from the RGB camera,
wherein the second feature point extraction unit extracts the second RGB feature point and the second ToF feature point by further using the auto-focusing information.

19. The image processing apparatus according to claim 10, further comprising a distance information obtaining unit obtaining a distance information on an object,
wherein the second feature point extraction unit extracts the second RGB feature point and the second ToF feature point by further using the distance information.

* * * * *